G. A. SCHEEFFER.
ELECTRIC METER.
APPLICATION FILED JAN. 14, 1910.

1,008,617.

Patented Nov. 14, 1911.

2 SHEETS—SHEET 1.

Witnesses:—

Inventor:—
Gustave A. Scheeffer
by Brown Williams
Attys.

G. A. SCHEEFFER.
ELECTRIC METER.
APPLICATION FILED JAN. 14, 1910.

1,008,617.

Patented Nov. 14, 1911.
2 SHEETS—SHEET 2.

Witnesses:
L. W. Novander,
George C. Higham.

Inventor:
Gustave A. Scheeffer
by Browne & Willis
Attys.

UNITED STATES PATENT OFFICE.

GUSTAVE A. SCHEEFFER, OF INDIANAPOLIS, INDIANA, ASSIGNOR TO COLUMBIA METER COMPANY, OF INDIANAPOLIS, INDIANA, A CORPORATION OF INDIANA.

ELECTRIC METER.

1,008,617.     Specification of Letters Patent.     Patented Nov. 14, 1911.

Application filed January 14, 1910. Serial No. 538,026.

*To all whom it may concern:*

Be it known that I, GUSTAVE A. SCHEEFFER, a citizen of the United States, residing at Indianapolis, in the county of Marion and State of Indiana, have invented a certain new and useful Improvement in Electric Meters, of which the following is a full, clear, concise, and exact description, reference being had to the accompanying drawings, forming a part of this specification.

My invention relates to an improved form of electricity meters adapted to measure a quantity of electricity flowing through any given circuit.

My improved meter construction provides for accuracy of operation, ease of inspection and repair and durability of working parts.

My invention consists particularly in the combination of the meter structure having a rotatable armature and a starting coil adapted to be connected in series with the armature to compensate for the friction of the moving parts and a compensating mechanism adapted to equalize the effects on the armature coils of the starting coil, and also to equalize the effects upon the armature of the series field winding employed therewith.

Figure 1:
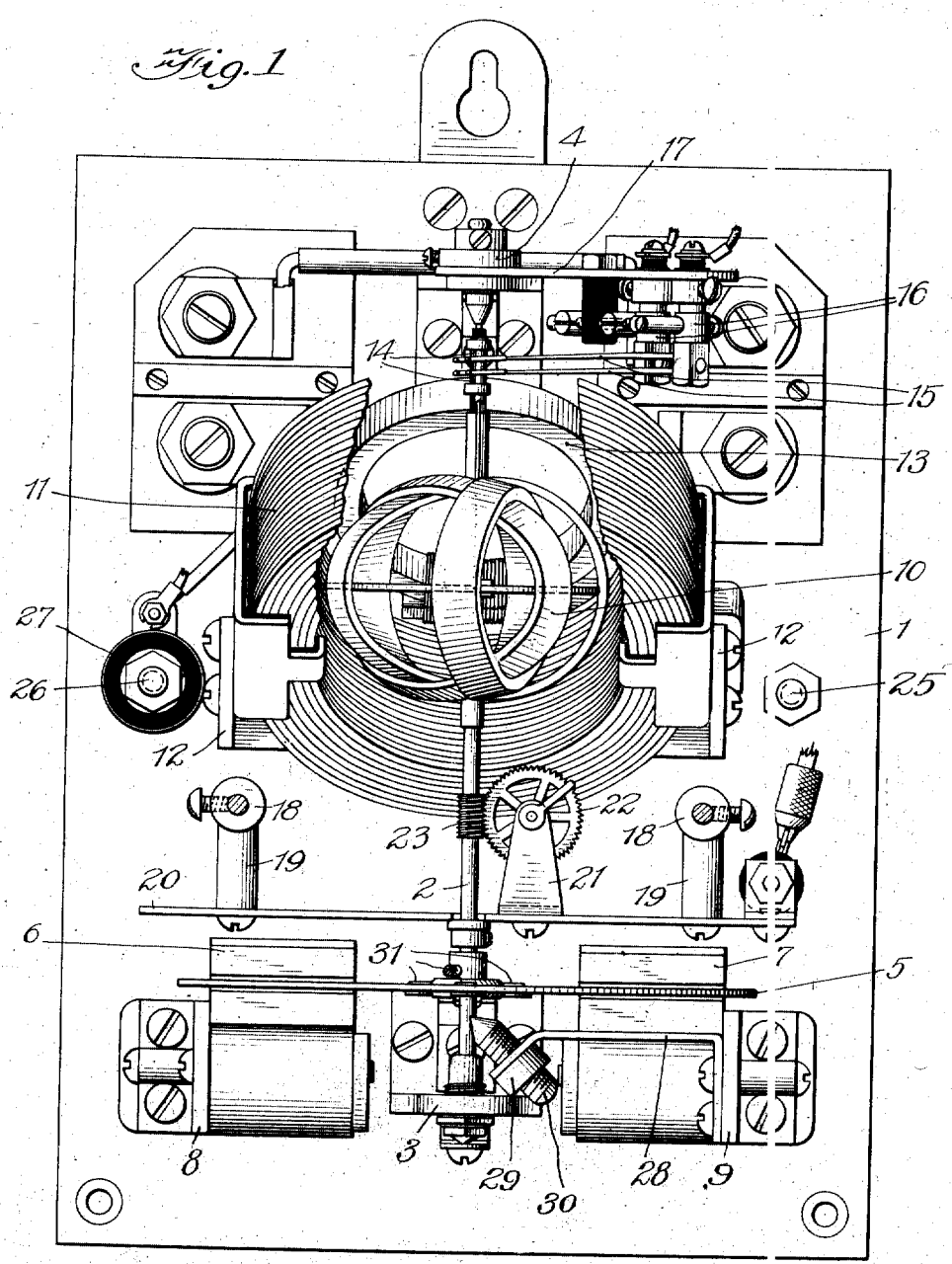
Figure 2:
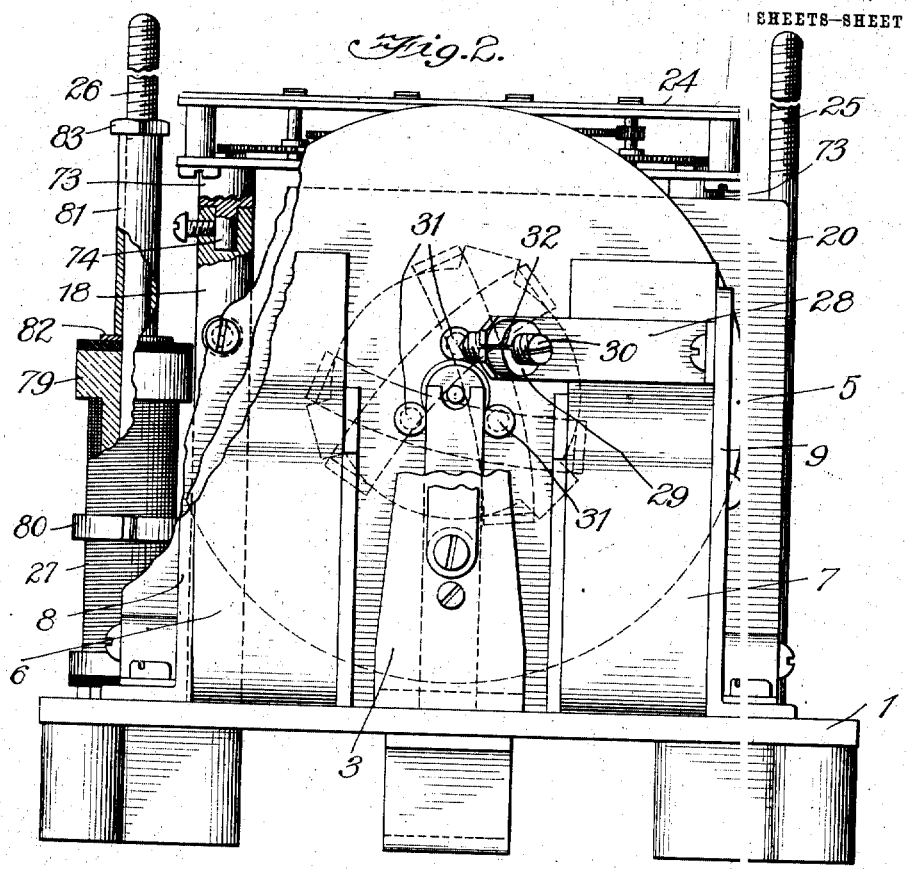
Figure 3:
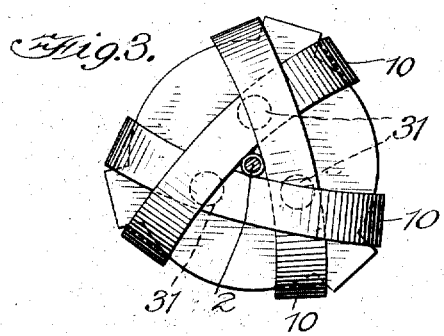

The several drawings illustrating my invention are as follows:

Figure 1 is a plan view of the meter mechanism complete with the casing thereof removed, and in this figure a portion of the field coil is broken away to show more clearly the armature windings and the starting coil. Fig. 2 is a lower end view of the parts shown in Fig. 1, a portion of the parts being broken away to show the structure of the supporting posts and the disposition of the armature resistance upon one of the posts used to secure the cover in place. Fig. 3 is an end view of the armature and shows in dotted lines the relative locations angularly of the compensating devices used to equalize the rotative effort exerted by the starting coil and field coil upon the armature.

Similar numerals refer to similar parts throughout the several drawings.

As shown in the drawings, the base 1 supports an armature shaft 2 by means of a lower bearing 3 and an upper bearing 4. The shaft 2 carries near its lower end a disk 5 of nonmagnetic material disposed between the poles of permanent magnets 6 and 7 held in proper position by the brackets 8 and 9 secured to the base plate 1. The shaft 2 has mounted thereon three armature coils 10 disposed in operative relation to a field coil 11 supported by brackets 12 from the base plate 1. A starting coil 13 is also supported from the base in suitable manner so as to occupy a position practically parallel with the field coil 11, the function of this starting coil being to exert a rotative tendency upon the armature windings to compensate for the friction of the moving parts. A commutator 14 is carried by the upper end of the armature shaft 2 and is connected with the windings 10. Brushes 15 are supported by brush holders 16 from the rocker arm 17 in such a manner as to rest upon the commutator 14. The rocker arm 17 is supported from the upper bearing 4 of the shaft 2. Main supporting posts 18 extend outwardly from and are rigidly secured to the base plate 1 and by means of arms 19 support a magnetic shield 20 between the permanent magnets 6 and 7 and the field coil and armature windings. The plate 20 has secured thereto a bracket 21 which forms the bearings for the worm wheel 22 engaging the worm 23 on the shaft 2. The posts 18 also serve to support the integrating mechanism 24 shown in Fig. 2. Posts 25 and 26 extending outwardly from and rigidly secured to the base plate 1, are provided to secure the cover in place to protect the operating mechanism of the meter. A resistance coil 27 is disposed upon the post 26 as indicated, such resistance coil being connected in series with the armature as is the usual practice.

The bracket 9 has extending therefrom a bent bar 28 of magnetic material which carries at its outer end a washer 29 through which is threaded a screw 30 of magnetic material such screw being pointed at its upper end and so disposed as to be brought adjacent to the path of three bodies of magnetic material 31 carried by the disk 5, such bodies being equidistant from the center of the shaft 2 and symmetrically disposed angularly on the disk relatively to the armature windings 10 in such manner that by the attraction exerted upon one of such bodies as it approaches the magnetized screw 30, the decreasing rotative effort exerted upon the corresponding armature coil at this time by either the starting coil or the field coil is compensated for and as the magnetic body passes the point of the screw 30, the attraction exerted between such body and the screw tends to retard the rotation of the disk 5 and to thus compensate for any abnormal rotative effort that may at this time be exerted upon the succeeding armature winding by the starting coil or field coil.

Since the bodies of magnetic material 31, which may consist of soft iron rivets, are symmetrically disposed angularly relatively to the windings 10, by adjusting the screw 30 in the washer 29, just that degree of acceleration and retardation will be exerted upon the disk 5 which is required to produce a uniform resultant motion of the armature and the parts driven thereby. The screw 30 is positively retained in any desired adjustment by the springing action of the washer 29 and the end of the bracket 28 permitted by the slot 32 formed in such bracket. The adjustable screw 30 may be permanently magnetized itself in order to constitute the adjusting pole referred to, but it is preferable to magnetize it by means of one of the poles of the magnet 7 as indicated in the drawings by disposing the bent bar 28 which for this purpose is of magnetic material in contact with one of the ends of the magnet 7.

It will be understood that the starting coil used in meters of this type is in reality a field coil which produces a magnetic field of just sufficient strength to balance the friction of the moving parts of the meter. By the term field coil, as used in the claims, therefore, I contemplate any construction of field coil that may by its inductive action produce varying rotative efforts upon armature windings since to any such condition my compensating mechanism is applicable.

While I have shown my compensating device in the particular embodiment herein disclosed, I do not, however, wish to be limited to this construction, but desire to claim broadly any equivalent that may suggest itself to those skilled in the art.

What I claim is:

1. In an electric meter, the combination of an armature shaft, armature windings carried by such shaft, a field coil in operative relation to such windings, a disk of non-magnetic material carried by such shaft, a retarding magnet disposed adjacent to such disk, bodies of magnetic material carried by such disk, such bodies corresponding in number to the armature windings and occupying fixed and symmetrical positions relatively thereto, and a magnetic pole disposed adjacent to the path of such magnetic bodies.

2. In an electric meter, the combination of an armature shaft, armature windings carried by such shaft, a field coil in operative relation to such windings, a disk of non-magnetic material carried by such shaft, a retarding magnet disposed adjacent to such disk, bodies of magnetic material carried by such disk, such bodies corresponding in number to the armature windings and occupying fixed and symmetrical positions relatively thereto, a bracket of magnetic material supported by such magnet, and a screw of magnetic material supported by such bracket with its end adjacent to the path of such bodies.

In witness whereof, I hereunto subscribe my name this 28th day of December, A. D. 1909.

GUSTAVE A. SCHEEFFER.

Witnesses:
ALBERT L. RABB,
JOHN E. SCOTT.

Copies of this patent may be obtained for five cents each, by addressing the "Commissioner of Patents, Washington, D. C."